(12) United States Patent
Kiefer

(10) Patent No.: US 7,201,842 B2
(45) Date of Patent: Apr. 10, 2007

(54) SCREENED GRAVITY-FED FUNNEL

(76) Inventor: W. John Kiefer, 2769 Waite Road, Nelson, British Columbia (CA) V1L 6K9

( * ) Notice: Subject to any disclaimer, the term of this patent is extended or adjusted under 35 U.S.C. 154(b) by 133 days.

(21) Appl. No.: 11/167,400

(22) Filed: Jun. 28, 2005

(65) Prior Publication Data
US 2006/0289346 A1 Dec. 28, 2006

(51) Int. Cl.
B01D 29/11 (2006.01)

(52) U.S. Cl. .................. 210/162; 210/170.1; 210/460; 405/127

(58) Field of Classification Search ................ 210/154, 210/162, 170, 460, 497.3, 499; 405/127
See application file for complete search history.

(56) References Cited

U.S. PATENT DOCUMENTS

| | | | |
|---|---|---|---|
| 243,446 A * | 6/1881 | Haggerty | 210/460 |
| 730,356 A | 6/1903 | Emond | |
| 1,274,121 A * | 7/1918 | White | 210/162 |
| 1,451,394 A | 4/1923 | Hurst | |
| 1,644,121 A | 10/1927 | Greene | |
| 1,945,824 A * | 2/1934 | Saxe | 210/460 |
| 2,249,020 A * | 7/1941 | McFarlin | 210/460 |
| 2,503,455 A * | 4/1950 | Sheren | 210/460 |
| 2,658,625 A | 11/1953 | Rafferty | |
| 2,886,181 A * | 5/1959 | Wiedorn | 210/460 |
| 3,323,536 A * | 6/1967 | O'Connor et al. | 405/127 |
| 3,722,686 A * | 3/1973 | Arnett et al. | 210/460 |
| 4,208,290 A | 6/1980 | Wetmore et al. | |
| 4,337,008 A | 6/1982 | Kulyabko et al. | |
| 5,102,537 A * | 4/1992 | Jones | 210/162 |
| 5,650,073 A * | 7/1997 | Merrett | 210/170 |
| 6,682,651 B1 * | 1/2004 | Toland et al. | 405/127 |

FOREIGN PATENT DOCUMENTS

| | | |
|---|---|---|
| CA | 2266703 | 9/2000 |
| DE | 3413413 | 10/1985 |

* cited by examiner

Primary Examiner—Christopher Upton
(74) Attorney, Agent, or Firm—Antony C. Edwards

(57) ABSTRACT

A screened gravity-fed water funnel or water funnel kit may be characterized in one aspect as including a substantially conically-shaped water-permeable mesh screen, a funnel releasably mounted or mountable to, and in fluid cooperation with, the screen, and a flexible tether mounted or mountable to the screen. An anchor or other means for embedding an upstream end of the tether immobile in the stream is mounted or mountable to the tether, opposite to the screen. That is, the anchor is mounted or mountable at an upstream end of the tether and an upstream narrow end of the screen is mounted or mountable to a downstream end of the tether, and wherein an upstream wide-end of the funnel is mounted to a downstream wide-end of the screen, and wherein a hose coupler is mounted or mountable to a downstream narrow end of the funnel.

20 Claims, 6 Drawing Sheets

SCREENED GRAVITY-FED FUNNEL

FIELD OF THE INVENTION

This invention relates to the field of devices for supplying water to fire-fighting equipment in remote areas, and in particular to a screened gravity-fed water funnel adapted for use in mountain streams for supplying water to a hose.

BACKGROUND OF THE INVENTION

It is well established that forest fires and wild fires are often started by lightening strikes or caused by the careless negligence of hunters, campers and other out-door recreationalists. The result is that fires start and propagate in areas which are difficult to access on convention wheeled vehicles, or are inaccessible other than by air or on foot. Quite often, the approach taken to containing forest fires and wild fires is to use a combination of air delivered fire retardant or water in conjunction with ground support, that is, fire fighters to clear fire breaks and generally to work to contain or steer the course of the fire or to install, for example, sprinklers to wet the vegetation to help slow or help contain the fire. In the case of the latter, the fire fighter has to carry on foot the hose lines and sprinklers the distance between the equipment drop off point, once delivered by air or road, and the location for installation of the sprinklers. The distance may be rather great. Conventionally, the source of water for the sprinkler systems has been a lake or pond or the like from which water is pumped. Thus in the past a heavy motorized pump and fuel has to be brought to the lake or pond, typically, again, carried in manually, along with hoses to connect the pump to the sprinkler system.

As may well be imagined, notwithstanding that the fire fighters may be individually strong and fit and thus capable of sustained strenuous activity, it may take many man-hours of arduous labour which might otherwise be spent setting up a plurality of sprinkler systems or otherwise working to contain the fire, to merely set up one sprinkler system.

In the prior art, applicant is aware of U.S. Pat. No. 4,337,008 which issued Jun. 29, 1982 to Kulyabko et al. for an Apparatus for Fish Protection. Kulyabko et al. disclose the use of a water-permeable screen mounted on a perforated suction pipe. Partitions are provided within the screen so as to cause a continuous wash-off stream directed along the screen surface, the stream creating a continuous fish-diverting current around the screen and which is taught to ensure protection of the screen against contamination with refuse.

Applicant is also aware of U.S. Pat. No. 4,208,290 which issued Jun. 17, 1980 to Wetmore et al. for a Self-Cleaning Inlet Screen to an Ocean Riser Pipe, Wetmore et al teaching fitting the lower inlet end of a cold water riser pipe in an ocean thermal energy conversion facility with a self-cleaning inlet screen which includes a right conical frustum of loose metal netting connected at its larger end to the pipe.

Applicant is also aware in the prior art of U.S. Pat. No. 2,658,625 which issued Nov. 10, 1953 to Rafferty for a Header Strainer for Liquid Lines in which a strainer member is disclosed for fitting in a nipple, U.S. Pat. No. 1,644,121 which issued on Oct. 4, 1927 to Greene for a Screen wherein a screen to cover the suction inlet of a centrifugal pump is disclosed, U.S. Pat. No. 1,451,394 which issued Apr. 10, 1923 to Hurst for a Fish Screen which discloses a funnel connected onto the end of an outlet pipe, U.S. Pat. No. 730,356 which issued Jun. 9, 1903 to Emond for a Filter in which a filter is disclosed for obstruction in the passage of the water to remove foreign matter, the filter including cone-shaped outer and inner casing. Applicant is also aware of Canadian Published Patent Application No. 2,266,703 entitled Zebra Mussel Filter Apparatus wherein it is taught to mount a filter bag over a foot valve of a water system. Applicant is also aware of Published Patent Application No.DE3413413 published Oct. 17, 1985, and entitled Apparatus for Continuously Separating Out and Diverting Solids and Cleaning Bodies From a Liquid Stream, wherein the use of two screens arranged in a roof shape within a cylindrical housing is disclosed.

SUMMARY OF THE INVENTION

Thus it would be advantageous, and it is an object of the present invention to provide, a simple, portable lightweight means for using mountain streams as a water source for sprinkler systems and the like wherein a rigid mesh, generally conical, or frusto-conical (herein collectively referred to as conical) screen deflects debris from the large open end of a funnel and wherein the funnel may be collapsible or hard-framed so that, with the screen mounted on the funnel and anchored in the flow of the stream, for example by the use of an anchored flexible tether so as to align the axis of symmetry of the screen with the direction of water flow, and with the large opening of the funnel mounted flush with the large open end of the screen, debris flowing in the water stream is deflected by the screen allowing water to pass through the screen into the funnel for supply downhill through a flexible hose for an end use in a sprinkler system or the like.

In summary, the screened gravity-fed water funnel or water funnel kit according to the present invention may be characterized in one aspect as including a substantially conically-shaped water-permeable mesh screen, a funnel releasably mounted or mountable to, and in fluid cooperation with, the screen, and a flexible tether mounted or mountable to the screen. An anchor or other means for embedding an upstream end of the tether immobile in the stream (collectively herein referred to as an anchor) is mounted or mountable to the tether, opposite to the screen. That is, the anchor is mounted or mountable at an upstream end of the tether and an upstream narrow end of the screen is mounted or mountable to a downstream end of the tether, and wherein an upstream wide-end of the funnel is mounted to a downstream wide-end of the screen and wherein a hose coupler is mounted or mountable to a downstream narrow end of the funnel.

The anchor and the tether, when anchored in a watercourse such as a stream, thus suspends the screen downstream of the anchor and the funnel downstream of the screen. The tether thus urges the screen into alignment with a direction of water flow along the water-course, whereby a supply of water from the water-course flows through the screen and funnel so as to provide water to a water hose when connected to the hose coupler. The water hose may then supply water to a remote, autonomous water sprinkler system.

Advantageously, the mesh screen is a metal mesh screen mounted on a substantially conically shaped support frame, wherein in one preferred embodiment, the mesh screen forms an angle approximately in the range of twenty to twenty-five degrees between the surface of the screen and a longitudinal axis of the gravity funnel passing through the narrow end of the screen and the narrow end of the funnel. The angle may be approximately twenty-two degrees.

Further, the mesh screen, when viewed in front elevation, has apertures having a substantially constant size of opening for the passage of water therethrough. The size of opening may be less than one-half inch, for example, the size of opening of the screen apertures may be substantially three/thirty-second of an inch (0.2 cm).

In one embodiment, the funnel is collapsible and substantially conically-shaped. The wide-end of the funnel is advantageously supported open by a frame so that the size and shape of the wide-end of the funnel match the size and shape of the wide-end of the mesh screen.

DETAILED DESCRIPTION OF EMBODIMENTS OF THE INVENTION

Figure 1:
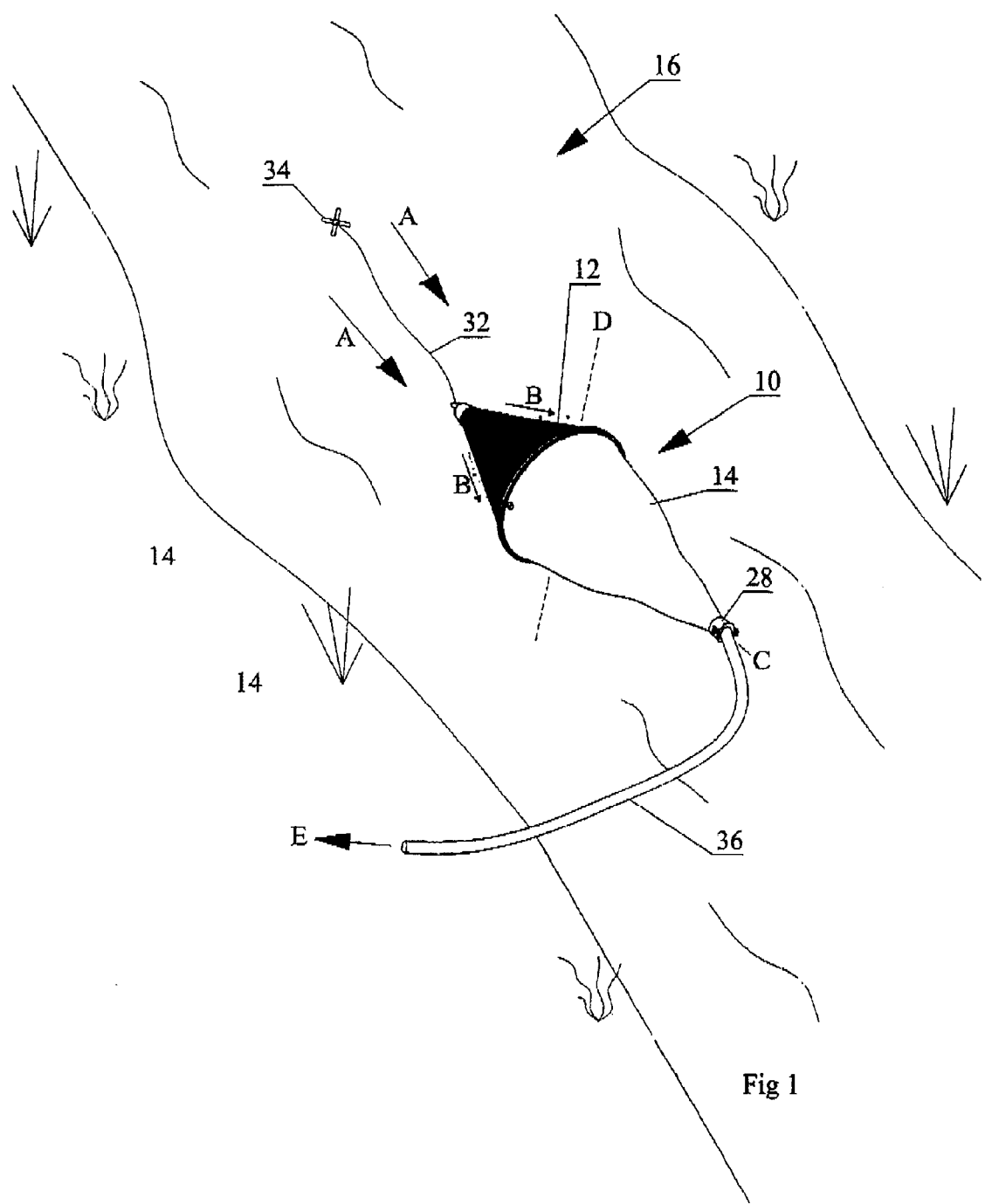
FIG. 1 is, in perspective view, the screened gravity-fed water funnel according to the present invention depicted in operation mounted in a stream.
Figure 2:
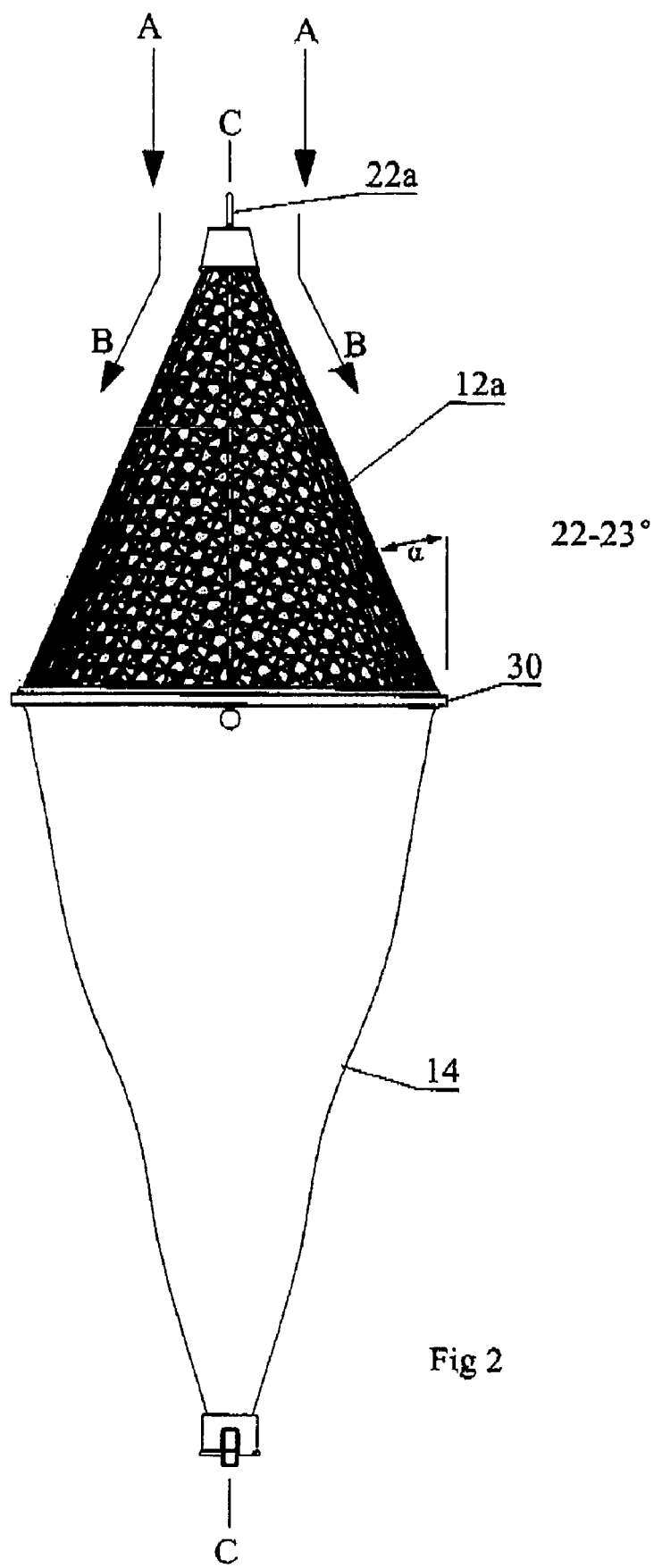
FIG. 2 is, in plan view, the screened gravity-fed water funnel of FIG. 1.
Figure 3:
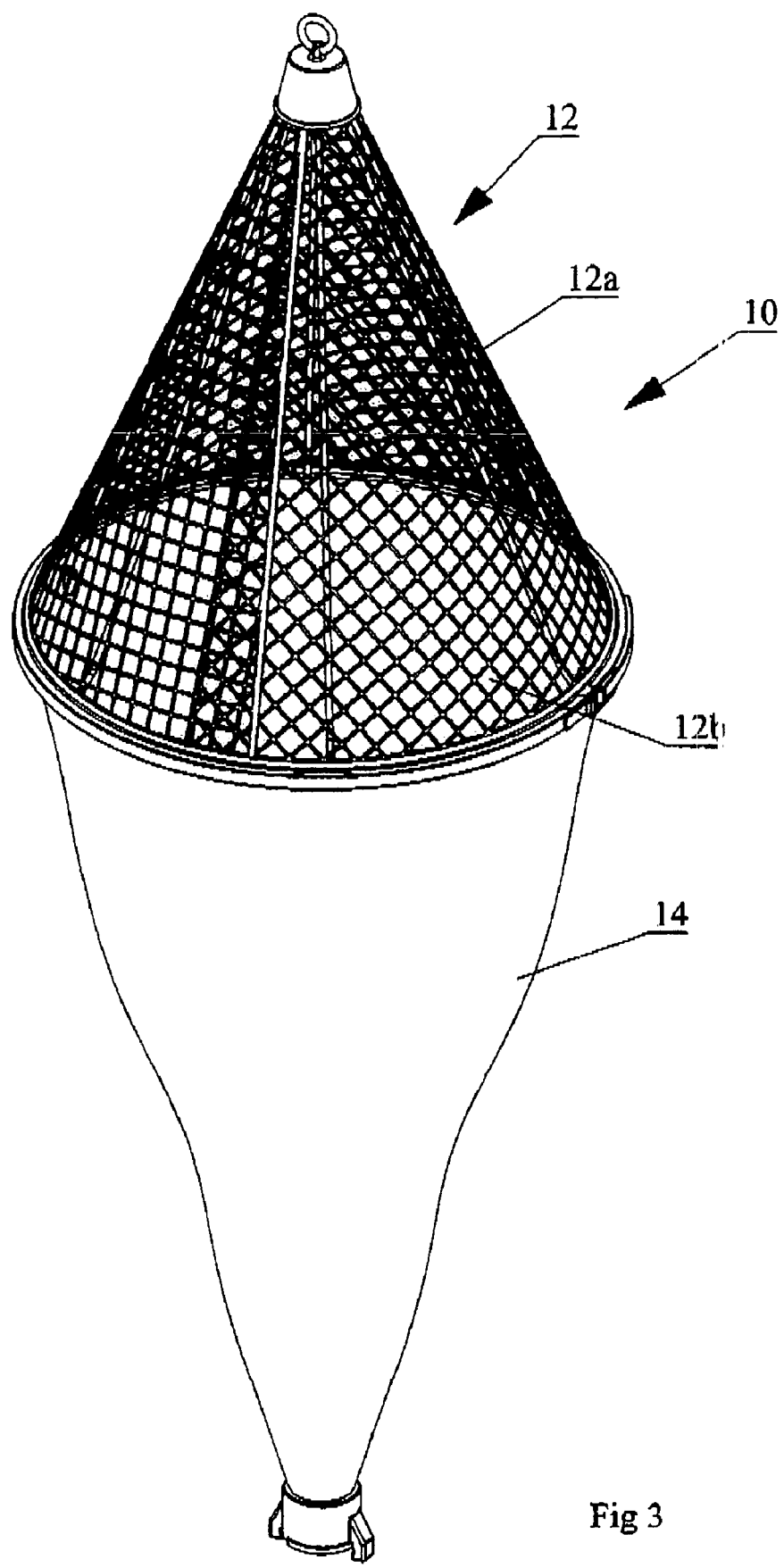
FIG. 3 is, in front perspective view, the screened gravity-fed water funnel of FIG. 2.

Quite often a water source which is closest to a forest fire or wild fire is a mountain stream rather than the lake or pond feeding the stream. It is advantageous to use a water source which is closest to the desired location for installing a sprinkler system or the like or other end uses not related to fighting fires, because it means that less hose has to be transported to the work site. With respect to the use of sprinkler systems in areas of forest or brush so as to wet the ground and foliage to inhibit the spread of fire, it is desirable to set up the sprinkler system and water source and leave it operating autonomously so that fire fighters may move on to set up other autonomous and automatically operating sprinkler systems.

The problem of trying to use a mountain stream as a water source for an autonomous sprinkler system is that the stream is often shallow and carries with it floating or otherwise water-born debris. Consequently, the screened gravity-fed water funnel 10 according to the present invention includes a mesh deflecting screen 12 releasably mountable to a water collecting funnel 14. It has been found advantageous that mesh screen 12 operate so as to deflect debris flowing in stream 16 downstream in direction A so as to deflect the debris, once it impacts screen 12, in direction B so as to cascade the debris under the force of the water flowing in direction A off the inclined side surfaces 12a rather than have the debris remain lodged on the screen in the manner of a filter so as to eventually clog the apertures 12b in the screen.

Figure 5:
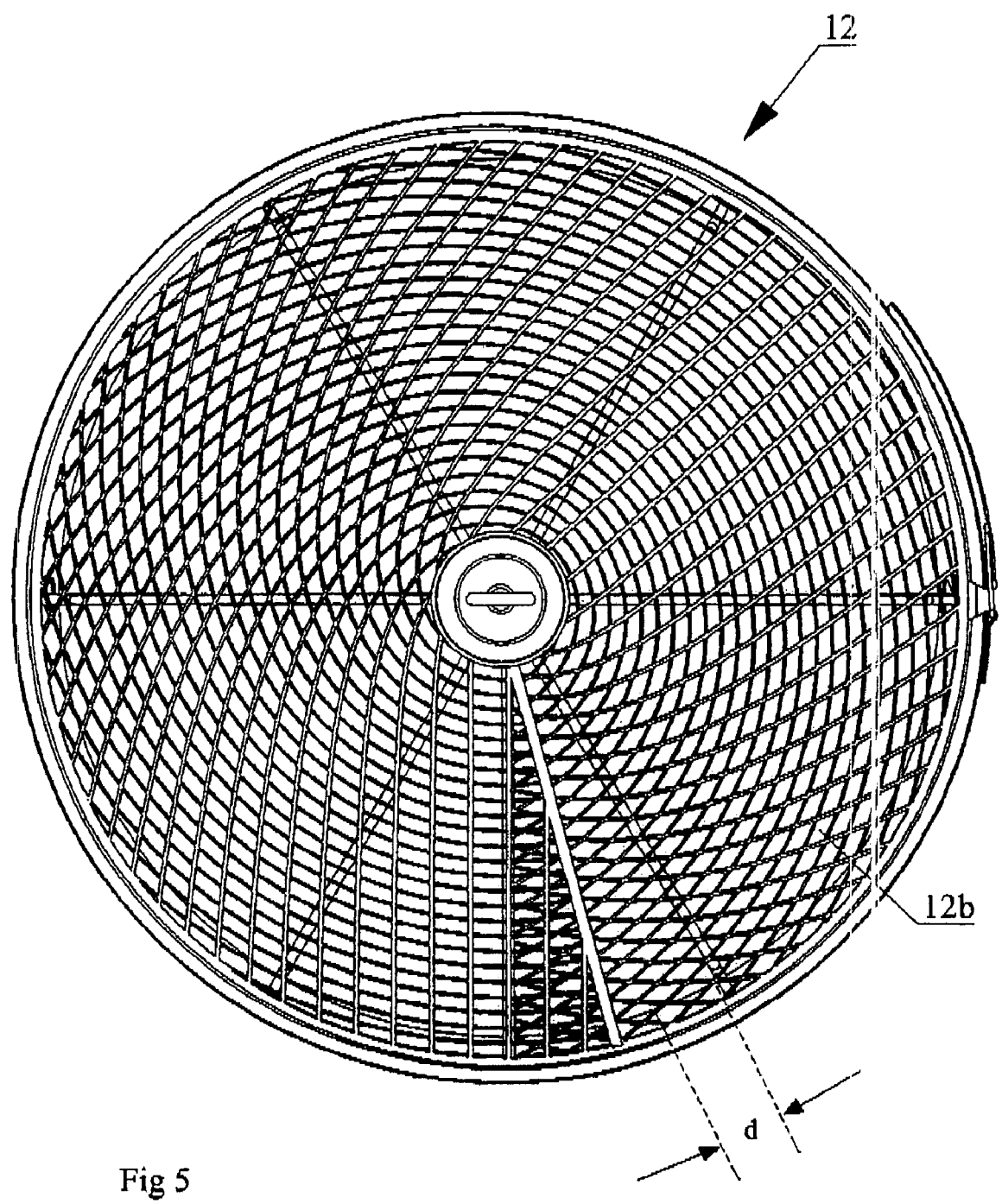
FIG. 5 is, in front elevation view, the mesh screen of the screened gravity-fed water funnel according to the present invention.
Figure 6:
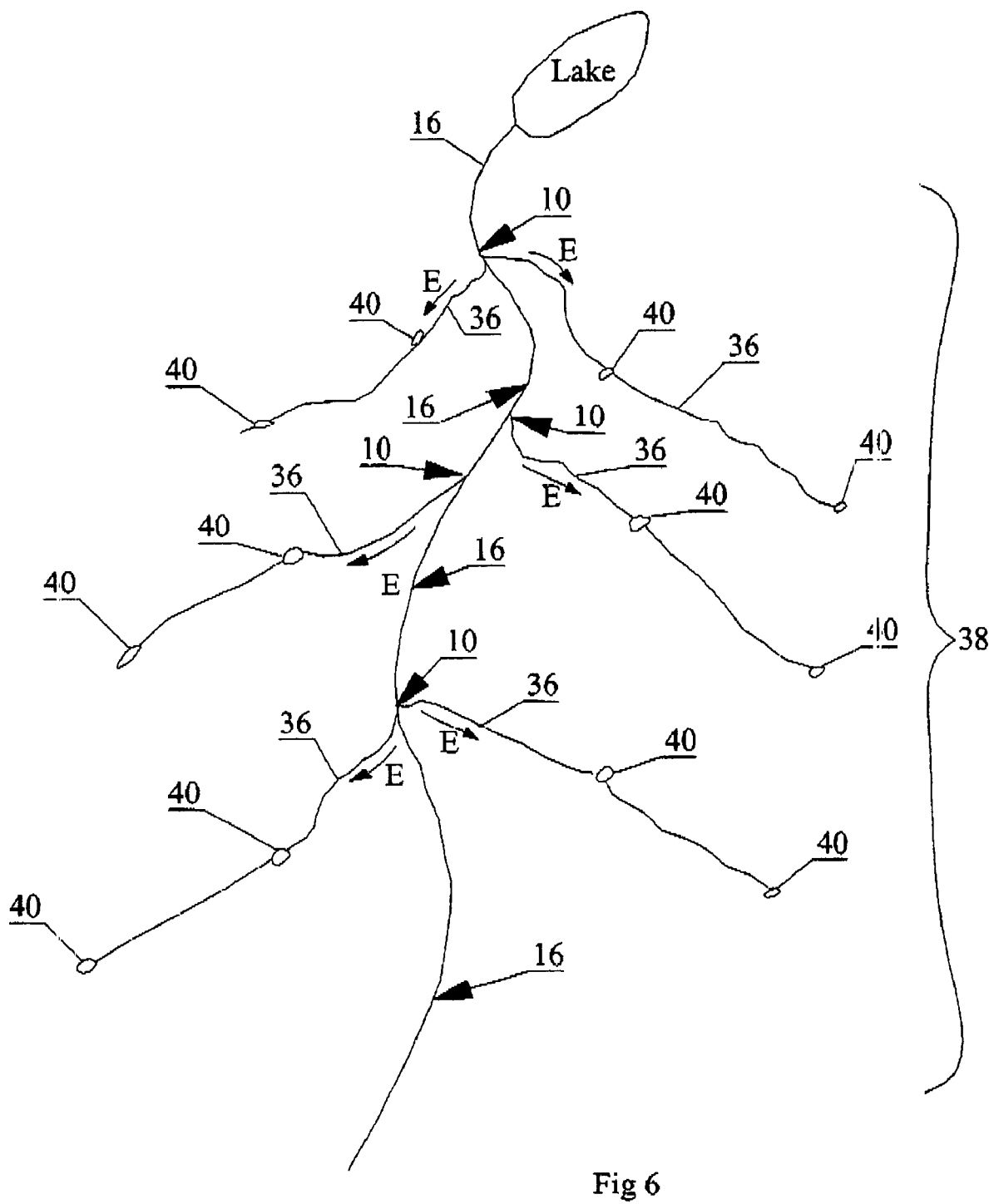
FIG. 6 is a diagrammatic view of sprinkler systems arranged so as to be fed water from a stream using screened gravity-fed water funnels according to the present invention.

Thus the shape of mesh screen 12, which as illustrated is conical and having sides 12a diverging downstream at angle α, may also be more generally frusto-conically shaped, or sides 12a may be curved sides rather than strictly conically shaped (collectively referred to herein as being conically shaped) so long as debris is deflected in direction B while allowing water to flow through the apertures 12b into funnel 14. It has also been found that a range of angles α may be effective so long as mesh screen 12 is somewhat rigid. Thus a mesh screen 12 having larger apertures 12b will be more steeply inclined, that is, angle α will be smaller, and a mesh screen 12 having smaller apertures may be inclined less steeply, that is, angle α will be larger, so long as the size of the apertures 12b, as they appear in the front elevation view of FIG. 5, that is, the apparent size of the apertures to the flow of water downstream in direction A, is a relatively constant predetermined front-on aperture sizing. In one embodiment applicant has successfully employed a front-on aperture sizing of 3/32 of an inch. Thus as seen in FIG. 5, apertures 12b of mesh screen 12 will appear from the direction of downstream flow to have apertures having maximum dimensions d which are constant and which may in one embodiment to be 3/32 of an inch (0.2 cm).

In the embodiment illustrated, mesh screen 12 includes a substantially rigid conically-shaped mesh 18 mounted over and onto a rigid conical frame 20 by means of an eye-bolt and nut pair 22a and 22b respectively. Funnel 14 may include a conically-shaped fabric sleeve 24 having its larger, upstream, open end 24a mounted to a rigid supporting frame ring 26, and having its smaller, downstream open end 24b mounted to a standard fire hose coupler 28. The downstream, large opening base end 20a of frame 20 is releasably mountable to ring 26 and upstream end 24a of sleeve 24 by means of a resilient clamping ring 30 which may, for example, be releasably clamped onto, so as to hold together, base end 20a and ring 26 by means of an over-center latch 30a.

Figure 4:
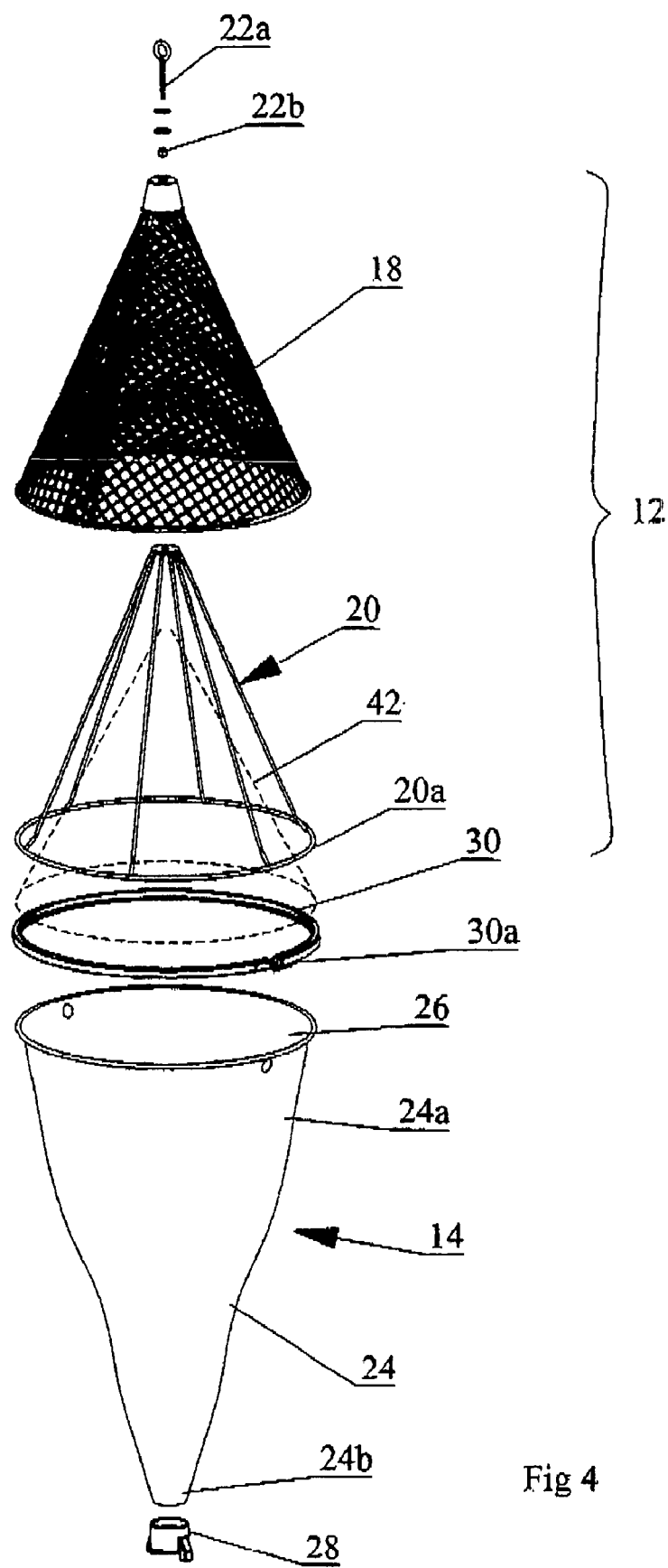
FIG. 4 is, in partially exploded view, the screened gravity-fed water funnel of FIG. 3.

In an alternative embodiment, one or more nested conical nested screens 42 (shown in dotted outline in FIG. 4) may be mounted nested within mesh screen 12. Nested screens 42 may advantageously have smaller apertures than the aperture sizing of screen 18, so as to screen out smaller debris which passes through the apertures of screen 18. A plurality of nested screens 42 would have progressively smaller debris.

With mesh screen 12 mounted to funnel 14, and with a flexible tether 32, which may be a length of rope approximately ten or twelve feet long, although other lengths will work, tied at one end to eye-bolt 22a and, at an upstream end of tether 32, tied to an anchor 34, then anchor 34 may merely be secured into the bed of stream 16 and the force of the water stream in direction A may then be sufficient (depending on the stream) to tension tether 32 so as to align or urge into alignment the longitudinal axis C with the direction of flow A. With sufficient water flow in the stream, that alignment is maintained under the urging of tether 32 which serves to pull on eye-bolt 22a if screen 12 is impacted by a large piece of debris so as to cause screen 12 to rotate, for example pivot about axis D, that is, so as to pivot about the lowermost edge of clamping ring 30.

Thus as may be appreciated, it is not necessary for the stream 16 to be sufficiently deep so as to fully submerge mesh screen 12 and funnel 14. Mesh screen 12 will serve to deflect large floating debris such as sticks and branches so that the screen gravity funnel 10 of the present invention may be used in shallow streams of the kind which may be most readily available to a fire fighter. The fire fighter merely anchors anchor 34 securely in the stream bed of stream 16, lays out tether 32 and places mesh screen 12 and funnel 14 into a convenient and preferably deeper part of the water flow aligning longitudinal axis C as best as possible parallel to flow direction A. Thus water flowing through apertures 12b is gathered and directed by funnel 14 through fire hose coupler 28 and fire hose 36 so as to supply a continuous water stream in direction E to a water sprinkler system 38 fed by hoses 36 and sprinklers 40.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A screened gravity-fed water funnel comprising:
   a substantially conically-shaped water-permeable mesh screen,
   a funnel releasably mounted to, in fluid cooperation with, said screen,
   a flexible tether mounted to said screen, an anchor mounted to said tether, opposite to said screen,
   wherein said anchor is mounted at an upstream end of said tether and an upstream narrow end of said screen is mounted to a downstream end of said tether, and wherein an upstream wide-end of said funnel is mounted to a downstream wide-end of said screen, and wherein a hose coupler is mounted to a downstream narrow end of said funnel,
   wherein said anchor and said tether when anchored in a water-course suspends said screen downstream of said anchor and said funnel downstream of said screen and wherein said tether urges said screen into alignment with a direction of water flow along said water-course, whereby a supply of water from the water-course flows through the screen and funnel so as to provide water to a water hose when connected to said hose coupler.

2. The device of claim 1 wherein said mesh screen is a metal mesh screen mounted on a substantially conically shaped support frame.

3. The device of claim 2 wherein said mesh screen forms an angle approximately in the range of twenty to twenty-five degrees between the surface of said screen and a longitudinal axis of said gravity funnel passing through said narrow end of said screen and said narrow end of said funnel.

4. The device of claim 3 wherein said angle is approximately twenty-two degrees.

5. The device of claim 3 wherein said mesh screen, when viewed in front elevation has apertures having a substantially constant size of opening for the passage of water therethrough.

6. The device of claim 5 wherein said size of opening is less than one-half inch.

7. The device of claim 6 wherein said size of opening is substantially three/thirty-second of an inch.

8. The device of claim 1 wherein said funnel is collapsible.

9. The device of claim 1 wherein said funnel is substantially conically-shaped.

10. The device of claim 1 wherein said wide-end of said funnel is supported open by a frame so that the size and shape of said wide-end of said funnel match the size and shape of said wide-end of said mesh screen.

11. A screened gravity-fed water funnel kit comprising:
    a substantially conically-shaped water-permeable mesh screen,
    a funnel releasably mountable to, in fluid cooperation with, said screen,
    a flexible tether mountable to said screen, an anchor mountable to said tether, opposite to said screen,
    wherein said anchor is mountable at an upstream end of said tether and an upstream narrow end of said screen is mounted to a downstream end of said tether, and wherein an upstream wide-end of said funnel is mountable to a downstream wide-end of said screen, and wherein a hose coupler is mountable to a downstream narrow end of said funnel,
    wherein said anchor and said tether when anchored in a water-course suspends said screen downstream of said anchor and said funnel downstream of said screen and wherein said tether urges said screen into alignment with a direction of water flow along said water-course, whereby a supply of water from the water-course flows through the screen and funnel so as to provide water to a water hose when connected to said hose coupler.

12. The device of claim 11 wherein said mesh screen is a metal mesh screen mounted on a substantially conically shaped support frame.

13. The device of claim 12 wherein said mesh screen forms an angle approximately in the range of twenty to twenty-five degrees between the surface of said screen and a longitudinal axis of said gravity funnel passing through said narrow end of said screen and said narrow end of said funnel.

14. The device of claim 13 wherein said angle is approximately twenty-two degrees.

15. The device of claim 13 wherein said mesh screen, when viewed in front elevation has apertures having a substantially constant size of opening for the passage of water therethrough.

16. The device of claim 15 wherein said size of opening is less than one-half inch.

17. The device of claim 16 wherein said size of opening is substantially three/thirty-second of an inch.

18. The device of claim 11 wherein said funnel is collapsible.

19. The device of claim 11 wherein said funnel is substantially conically-shaped.

20. The device of claim 11 wherein said wide-end of said funnel is supported open by a frame so that the size and shape of said wide-end of said funnel match the size and shape of said wide-end of said mesh screen.

* * * * *